2,868,829

COLOUR PHOTOGRAPHY

Dennis Peter Ayres and Douglas James Fry, Ilford, England, assignors to Ilford Limited, Ilford, England, a British company No Drawing. Application January 16, 1956
Serial No. 559,101

Claims priority, application Great Britain January 29, 1955

6 Claims. (Cl. 260—471)

This invention relates to colour photography and in particular to processes of colour photography in which development of a silver image in a silver halide photographic emulsion layer is effected by means of a developing substance, the oxidation products of which combine with a so-called colour-coupler present in the system to form a dyestuff image in situ with the silver image. Such processes are commonly referred to as processes of chromogenic development. The developing agent employed is normally an aromatic primary amino compound such as N,N-diethyl p-phenylamine diamine. The colour-couplers employed are commonly substituted phenols or naphthols, or compounds containing a reactive methylene group, the dyestuffs formed being indophenol or azomethine types of dye.

Tests carried out on a number of colour-couplers yielding yellow dyestuffs have revealed that the dyestuffs have much less absorption in the violet and ultra-violet regions of the spectrum than they have in the blue region of the spectrum. This relative transparency is a disadvantage in certain respects. Thus, when a colour transparency containing such a yellow image layer is copied on to a print material, the yellow dye image permits the transmission of a high proportion of violet and ulta-violet radiation from the exposing light, and this radiation affects, and to some extent falsifies, the recording on the printed material. This disadvantage is accentuated if the silver halide emulsion of the print material is one which is itself highly sensitive to violet or ultra-violet radiation, e. g. a silver chloride emulsion.

The present invention provides a class of colour-couplers which yield yellow dyestuffs having a relatively high absorption in the violet and ultra-violet regions of the spectrum and which, in use, overcome or minimise the difficulties referred to above. The said colour-couplers are novel compounds per se.

According to the present invention there are provided colour-couplers of the general formula:

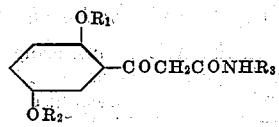

where $R_1$ and $R_2$ are alkyl groups containing up to 4 carbon atoms and $R_3$ is an aromatic grouping or a substituted aromatic grouping. Thus, the group $R_3$ may be a benzene or naphthalene group and may carry one or more substituents selected from any of the following: alkyl, e. g. methyl, ethyl, propyl and higher alkyl such as alkyl groups containing up to 20 carbon atoms; aryl, e. g. phenyl; aralkyl, e. g. benzyl; alkyloxy, e. g. methoxy and ethoxy; aryloxy, e. g. phenoxy; amino substituted by alkyl, aralkyl or aryl groups, e. g. those referred to above; amino substituted by acyl, e. g. acetamino and sulphonyl amino, such as p-toluene sulphonyl amino; carboxyl; carboxylic ester, e. g. ethoxy carbonyl; amino-substituted carboxylic ester, e. g. dialkylamino alkoxy carbonyl; amino sulphonyl; nitro; thioalkyl; and oxyalkyl and oxyalkoxy, including polyoxyalkoxy groups.

When the molecular size of the compound is large enough, e. g. when it contains long chain alkyl groups in the $R_3$ grouping, such as groups of 10–18 carbon atoms, or when it contains large substituent groups such as diphenoxyphenyl groups, the colour-couplers obtained present the further advantage that when introduced into a gelatino silver halide photographic emulsion they have a reduced tendency to migrate from the layer in which they are incorporated, either during keeping or processing.

In the case of these long chain alkyl types of compound it is preferred that the compounds should contain one or two water-solubilising groups such as carboxylic or sulphonic acid groups, and these may be present as further substituents in the group $R_3$.

According to a further aspect of this invention there is provided a process of colour photography which comprises developing a silver image in a silver halide photographic emulsion by means of an aromatic primary amino developing agent in the presence of a colour-coupler as just defined, the said colour-coupler being initially included in the photographic emulsion, or being included in the developer composition.

According to a still further aspect of this invention colour transparencies produced by the aforesaid process are printed on to multilayer subtractive colour print material to produce positive prints thereof in colour. In particular, such colour transparencies are printed on to multilayer subtractive colour print material of a type known per se and adapted to be processed to a positive image by the silver-dye-bleach process of colour photography.

The following examples will serve to illustrate the production of colour couplers according to the invention:

EXAMPLE 1

*Preparation of 2:5-dimethoxybenzoylacetanilide*

2.6 g. 2:5-dimethoxybenzoylacetic ethyl ester was dissolved in 20 ccs. dry xylene in a flask arranged for distillation and the solution heated to boiling. To the boiling solution was slowly added a solution of 0.93 g. aniline in 10 ccs. xylene containing a few drops of pyridine; the rate of addition was adjusted to be equal to the rate of removal by distillation of xylene together with the alcohol liberated in the reaction. After complete addition, the slow distillation was continued until a further 5 ccs. had been collected. The contents of the flask were transferred while hot to a beaker and then cooled. When crystallisation commenced, the mixture was diluted with petroleum ether (B. P. 60–80°) and thoroughly cooled. The solid product was filtered off and purified by recrystallisation from a mixture of benzene and petroleum ether. Colourless crystals, M. P. 130° C.

EXAMPLE 2

*Preparation of 2:5-dimethoxybenzoylacet-o-chloroanilide*

This preparation was conducted as in Example 1 but using 1.3 g. o-chloroaniline in place of 0.93 g. aniline. The product separated as colourless crystals from a mixture of benzene and petroleum ether. M. P. 156°.

EXAMPLE 3

*Preparation of 2:5-dimethoxybenzoylacet-o-anisidide*

This compound was prepared by the same procedure as in Example 1, using 1.4 g. o-anisidine in place of 0.93 g. aniline. It separated from benzene-petroleum ether as colourless crystals, M. P. 122–124°.

The following examples, 4–15 inclusive, are made by the general procedure of Example 1, substituting for 0.93 g. of aniline the quoted weight of the specified amine.

EXAMPLE 4

*Preparation of 2:5-dimethoxybenzoylacet-p-ethoxycarbonyl anilide*

From 1.65 g. ethyl-p-aminobenzoate. The product was crystallised from a mixture of benzene and petroleum ether to give colourless crystals, M. P. 132° C.

EXAMPLE 5

*Preparation of 2:5-dimethoxybenzoylacet-p-carboxyanilide*

From 1.37 g. p-aminobenzoic acid. The product was recrystallised from aqueous alcohol to give colourless crystals, M. P. 211° C.

EXAMPLE 6

*Preparation of 2:5-dimethoxybenzoylacet-o-carboxyanilide*

From 1.37 g. anthranilic acid. The product was recrystallised from aqueous alcohol to give colourless crystals, M. P. 175° C.

EXAMPLE 7

*Preparation of 2:5-dimethoxybenzoylacet-m-carboxyanilide*

From 1.37 g. m-aminobenzoic acid. The product crystallised from aqueous alcohol as colourless crystals, M. P. 180° C.

EXAMPLE 8

*Preparation of 2:5-dimethoxybenzoylacet-p-(diethylaminoethoxycarbonyl) anilide*

From 2.36 g. β-diethylaminoethyl p-aminobenzoate. The compound separated as colourless crystals from a mixture of benzene and petroleum ether, M. P. 94° C.

EXAMPLE 9

*Preparation of 2:5-dimethoxybenzoylacet-p-sulphonamido anilide*

From 1.72 g. sulphonilamide. Separated as buff needles from aqueous alcohol, M. P. 200° C.

EXAMPLE 10

*Preparation of 3-(2':5'-dimethoxy benzoylacetamido)-4-methyloctadecylaminobenzoic acid*

From 4.18 g. 3-amino-4-methyloctadecylaminobenzoic acid. Crystallised from benzene as colourless crystals, M. P. 130° C.

EXAMPLE 11

*Preparation of N-(2:5-dimethoxybenzoylacetyl)-N'-(p-toluenesulphonyl)-p-phenylenediamine*

The product was recrystallised from alcohol to give colourless crystals, M. P. 183° C.

EXAMPLE 12

*Preparation of 2':5'-dimethoxybenzoylacet-2:4-di-o-cresoxyanilide*

From 3.1 g. 2:4-di-o-cresoxyaniline. The product was recrystallised from benzene to give colourless crystals, M. P. 108° C.

EXAMPLE 13

*Preparation of 2:5-dimethoxybenzoylacet-p-thioanisidide*

From 1.4 g. p-aminothioanisole. The product separated from benzene as colourless crystals, M. P. 136° C.

EXAMPLE 14

*Preparation of 2:5-dimethoxybenzoylacet-p-nitranilide*

From 1.38 g. p-nitraniline. The product was recrystallised from alcohol to give pale yellow crystals, M. P. 166° C.

EXAMPLE 15

*Preparation of 2:5-dimethoxybenzoylacet-p-acetaminoanilide*

From 1.5 g. p-aminoacetanilide. The product separated from alcohol as colourless crystals, M. P. 218° C.

EXAMPLE 16

*Preparation of 2:5-diethoxybenzoylacetanilide*

The preparation was conducted as in Example 1 using 2.9 g. ethyl-2:5-diethoxybenzoylacetate in place of 2.6 g. ethyl-2:5-dimethoxybenzoylacetate. The product was recrystallised from benzene. Colourless crystals, M. P. 165° C.

EXAMPLE 17

*Preparation of 2:5-diethoxybenzoylacet-o-chloroanilide*

Prepared as for Example 16 but using 1.3 g. o-chloroaniline in place of 0.93 g. aniline. Purified by recrystallisation from alcohol. M. P. 118° C.

EXAMPLE 18

*Preparation of 2:5-diethoxybenzoylacet-o-toluidide*

The compound was prepared, by reacting in xylene by the procedure of Example 1, 2.9 g. ethyl 2:5-diethoxybenzoylacetate and 1.1 g. o-toluidine. Recrystallised from carbon tetrachloride as colourless crystals, M. P. 137° C.

EXAMPLE 19

*Preparation of 2:5-diethoxybenzoylacet-o-anisidide*

The preparation was effected as in Example 3 but using 2.9 g. ethyl-2:5-diethoxybenzoylacetate in place of 2.6 g. ethyl-2:5-dimethoxybenzoylacetate. The product was recrystallised from aqueous alcohol. M. P. 90° C.

EXAMPLE 20

*Preparation of 2:5-diethoxybenzoylacet-2':4'-xylidide*

The compound was prepared by reacting together in xylene by the general procedure of Example 1, 2.9 g. ethyl 2:5-diethoxybenzoylacetate and 1.25 g. m-4-xylidine. It was recrystallised from alcohol as colourless crystals, M. P. 134° C.

EXAMPLE 21

*Preparation of 2:5-diethoxybenzoylacet-p-anisidide*

The preparation was conducted as in Example 19 but using p-anisidine instead of o-anisidine. The product separated from alcohol as colourless crystals, M. P. 168° C.

EXAMPLE 22

*Preparation of 3(2':5'-diethoxybenzoylacetamido)-4-methyloctadecylaminobenzoic acid*

Prepared as in Example 10 but using 2.9 g. ethyl 2:5-diethoxybenzoylacetate in place of 2.6 g. ethyl 2:5-dimethoxybenzoylacetate. Recrystallised from benzene as colourless crystals. M. P. 140° C.

EXAMPLE 23

*Preparation of 2:5-diethoxybenzoylacet-p-carboxyanilide*

Prepared as in Example 5 but using 2.9 g. ethyl 2:5-diethoxybenzoylacetate in place of 2.6 g. ethyl 2:5-dimethoxy benzoylacetate. The product crystallised from aqueous alcohol as colourless crystals. M. P. 187° C.

The following example will serve to illustrate the use of the colour couplers of the invention in the production of colour developed yellow dye images:

EXAMPLE 24

A photographic film carrying a gelatino silver bromide photographic emulsion is exposed and then developed in a developing solution constituted as follows:

| | |
|---|---|
| 2-amino-5-diethylamino toluene hydrochloride___g__ | 1 |
| Sodium carbonate decahydrate_____g__ | 40 |
| Sodium hexametaphosphate_____g__ | 1.5 |
| Sodium sulphite_____g__ | 2.5 |
| Industrial ethyl alcohol_____cc__ | 50 |
| Potassium bromide_____g__ | 1 |
| Colour coupler_____g__ | 1 |

Water to make 500 cc.

The developed film was then rinsed and bleached in Farmer's reducer to remove residual silver and silver bromide, washed and dried, affording a yellow image negative with respect to the original subject to which the film was exposed.

As stated above, the dyestuffs obtained from the colour-couplers of this invention have a reduced transparency to violet and ultra-violet radiation.

When yellow dye images are produced using the colour couplers of this invention and are then printed on to multilayer colour print material of the type adapted to be processed by the silver-dye-bleach process of colour photography, the density of the yellow print image (over the range up to but not including the maximum density) is substantially greater for a given density level of yellow dye derived from a colour coupler of the present invention than from the same density level of yellow dye derived from a colour coupler of the prior art.

The property of reduced transparency to violet and ultra-violet radiation and the results obtained when the dyes are printed as just described are set out in the following Tables I and II.

The compound first named in Table I is a typical colour coupler of the non-substantive type known per se, while the compound first named in Table II is a typical substantive colour coupler known per se, and these are included as comparison compounds.

The foregoing densities were determined to light passing an "Ilford" Colour Filter No. 304. (The word Ilford is a registered trademark.) Since the dyes derived from colour couplers according to this invention are more absorbtive of ultra-violet radiation, less of such radiation is transmitted from the printing light source through the dye image to the print material. The extent of exposure of the ultra-violet-sensitive layer of the print material is thus reduced so that there is less bleaching of dyestuff by the silver developed therein and accordingly a higher density of dyestuff is obtained.

What we claim is:

1. A colour-coupler of the general formula:

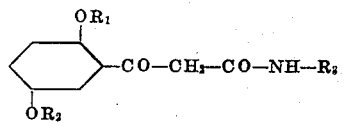

where $R_1$ and $R_2$ are each an alkyl group containing up to 4 carbon atoms and $R_3$ is selected from the class consisting of phenyl, alkyl phenyl, aralkyl phenyl, aryl phenyl, alkoxy phenyl, aryloxy phenyl, carboxyl phenyl, alkoxy carbonyl phenyl, dialkylamino alkoxy carbonyl phenyl, sulphonamido phenyl, nitro phenyl, and alkylthio phenyl.

2. 2:5-dimethoxybenzoylacet-o-anisidide.

3. 2:5-dimethoxybenzoylacet-p-ethoxycarbonyl anilide.

TABLE I

| Colour-former | Relative densities of dye at— | | Density of Colour-former Dye D.1 | Density of Print Dye D.2 | D.2/D.1 |
|---|---|---|---|---|---|
| | 440 mμ | 385 mμ | | | |
| 2:4-Dichloroacetoacetanilide | 1.0 | 0.55 | 0.30 / 0.75 | 0.22 / 0.44 | 0.73 / 0.59 |
| 2:5-Dimethoxybenzoylacet-o-chloroanilide | 1.0 | 0.77 | 0.24 / 0.68 | 0.22 / 0.62 | 0.91 / 0.91 |
| 2:5-Dimethoxybenzoylacet-anilide | 1.0 | 0.87 | 0.18 / 0.45 | 0.20 / 0.56 | 1.11 / 1.24 |
| 2:5-Dimethoxybenzoylacet-o-anisidide | 1.0 | 0.88 | 0.21 / 0.70 | 0.28 / 0.84 | 1.33 / 1.20 |
| 2:5-Diethoxybenzoylacet-anilide | 1.0 | 0.88 | 0.56 / 0.90 | 0.56 / 0.88 | 1.00 / 0.98 |
| 2:5-Diethoxybenzoylacet-o-toluidide | 1.0 | 0.87 | 0.65 / 1.04 | 0.68 / 1.00 | 1.04 / 0.96 |
| 2:5-Diethoxybenzoylacet-o-chloroanilide | 1.0 | 0.79 | 0.50 / 1.18 | 0.60 / 1.10 | 1.20 / 0.94 |
| 2:5-Diethoxybenzoylacet-o-anisidide | 1.0 | 0.89 | 0.37 / 0.82 | 0.42 / 0.96 | 1.14 / 1.17 |
| 2:5-Diethoxybenzoylacet-2':4'-xylidide | 1.0 | 0.96 | 0.60 / 0.93 | 0.70 / 0.92 | 1.16 / 0.99 |
| 2:5-Diethoxybenzoylacet-p-anisidide | 1.0 | 1.00 | 0.56 / 0.82 | 0.64 / 0.88 | 1.14 / 1.07 |
| 2:5-Dimethoxybenzoylacet-p-ethoxycarbonyl anilide | 1.0 | 0.83 | 0.36 / 0.68 | 0.32 / 0.56 | 0.89 / 0.82 |
| 2:5-Dimethoxybenzoylacet-p-carboxyanilide | 1.0 | 0.89 | 0.36 / 0.52 | 0.30 / 0.48 | 0.83 / 0.92 |
| 2:5-Diethoxybenzoylacet-p-carboxyanilide | 1.0 | 0.91 | 0.60 / 0.98 | 0.64 / 1.00 | 1.07 / 1.02 |
| 2:5-Dimethoxybenzoylacet-o-carboxyanilide | 1.0 | 0.93 | 0.20 / 0.36 | 0.30 / 0.48 | 1.50 / 1.32 |
| 2:5-Dimethoxybenzoylacet-m-carboxyanilide | 1.0 | 0.80 | 0.60 / 0.98 | 0.64 / 1.00 | 1.07 / 1.02 |
| 2:5-Dimethoxybenzoylacet-p-sulphonamido anilide | 1.0 | 0.80 | 0.43 / 0.77 | 0.40 / 0.76 | 0.93 / 0.99 |
| 2:5-Dimethoxybenzoylacet-p-(diethylaminoethoxy-carbonyl) anilide | 1.0 | 1.25 | 0.38 / 0.78 | 0.30 / 0.70 | 0.79 / 0.90 |

TABLE II

| Colour-former | Relative densities of dye at— | | Density of Colour-former Dye D.1 | Density of Print Dye D.2 | D.2/D.1 |
|---|---|---|---|---|---|
| | 440 mμ | 385 mμ | | | |
| p-(Octadecanoylamino)benzoyl acetamino iso phthalic acid | 1.0 | 0.60 | 0.74 / 1.47 | 0.56 / 1.10 | 0.70 / 0.75 |
| 3(2':5'-Diethoxybenzoylacet-amido)-4-methyloctadecyl-aminobenzoic acid | 1.0 | 1.36 | 0.47 / 0.75 | 0.60 / 1.00 | 1.43 / 1.33 |
| 3(2':5'-Dimethoxy benzoylacetamido)-4-methyloctadec-ylaminobenzoic acid | 1.0 | 1.35 | 0.35 / 0.65 | 0.44 / 0.80 | 1.25 / 1.23 |
| 2':5'-Dimethoxybenzoylacet-2:4-di-o-cresoxyanilide | 1.0 | 1.40 | 0.29 / 0.50 | 0.28 / 0.58 | 0.96 / 1.16 |

4. 3 - (2':5' - dimethoxybenzoylacetamido) - 4 - methyloctadecyl-aminobenzoic acid.
5. 2:5 - diethoxybenzoylacet - o - chloroanilide.
6. 2:5 - diethoxybenzoylacet - p - carboxyanilide.

References Cited in the file of this patent

UNITED STATES PATENTS

| | | |
|---|---|---|
| 2,347,722 | Wenner | May 2, 1944 |
| 2,361,327 | Sparks | Oct. 24, 1944 |
| 2,403,040 | Bavely | July 2, 1946 |
| 2,407,210 | Weissberger et al. | Sept. 3, 1946 |
| 2,411,951 | Bavely | Dec. 3, 1946 |
| 2,652,329 | McCrossen et al. | Sept. 15, 1953 |
| 2,728,658 | McCrossen et al. | Dec. 27, 1955 |